United States Patent [19]

LoBiondo et al.

[11] Patent Number: 5,305,199
[45] Date of Patent: Apr. 19, 1994

[54] CONSUMABLE SUPPLIES MONITORING/ORDERING SYSTEM FOR REPROGRAPHIC EQUIPMENT

[75] Inventors: Martin F. LoBiondo, Penfield, N.Y.; Paul A. Baiter, Huntsville, Ala.

[73] Assignee: Xerox Corporation, Stamford, Conn.

[21] Appl. No.: 967,475

[22] Filed: Oct. 28, 1992

[51] Int. Cl.⁵ .............................................. G06F 15/00
[52] U.S. Cl. ................................... 364/403; 355/204; 355/209
[58] Field of Search ............... 364/403, 400, 401, 402, 364/403, 406; 355/204, 206, 209

[56] References Cited

U.S. PATENT DOCUMENTS

| | | | |
|---|---|---|---|
| 4,459,663 | 7/1984 | Dye | 364/200 |
| 4,496,237 | 1/1985 | Schron | 355/14 C |
| 4,636,950 | 1/1987 | Caswell et al. | 364/403 |
| 4,656,591 | 4/1987 | Goldberg | 364/478 |
| 4,737,910 | 4/1988 | Kimbrow | 364/403 |
| 4,783,740 | 11/1988 | Ishizawa et al. | 364/403 |
| 5,038,319 | 8/1991 | Carter et al. | 364/900 |
| 5,057,866 | 10/1991 | Hill, Jr. et al. | 355/200 |
| 5,077,582 | 12/1991 | Kravette et al. | 355/206 |

Primary Examiner—Roy N. Envall, Jr.
Assistant Examiner—Ari M. Bai
Attorney, Agent, or Firm—Oliff & Berridge

[57] ABSTRACT

A reprographic machine includes an inventory tracking system for monitoring consumable supplies. Usage data from a plurality of networked reprographic machines is supplied to a single tracking system for monitoring inventories of supplies consumed by the network. Automatic or semi-automatic ordering can be provided via a remote interactive communication system. Order confirmation, projected shipment dates and shipment confirmations can be provided from the reorder site. The system can provide inventory monitoring customized to a local network.

11 Claims, 5 Drawing Sheets

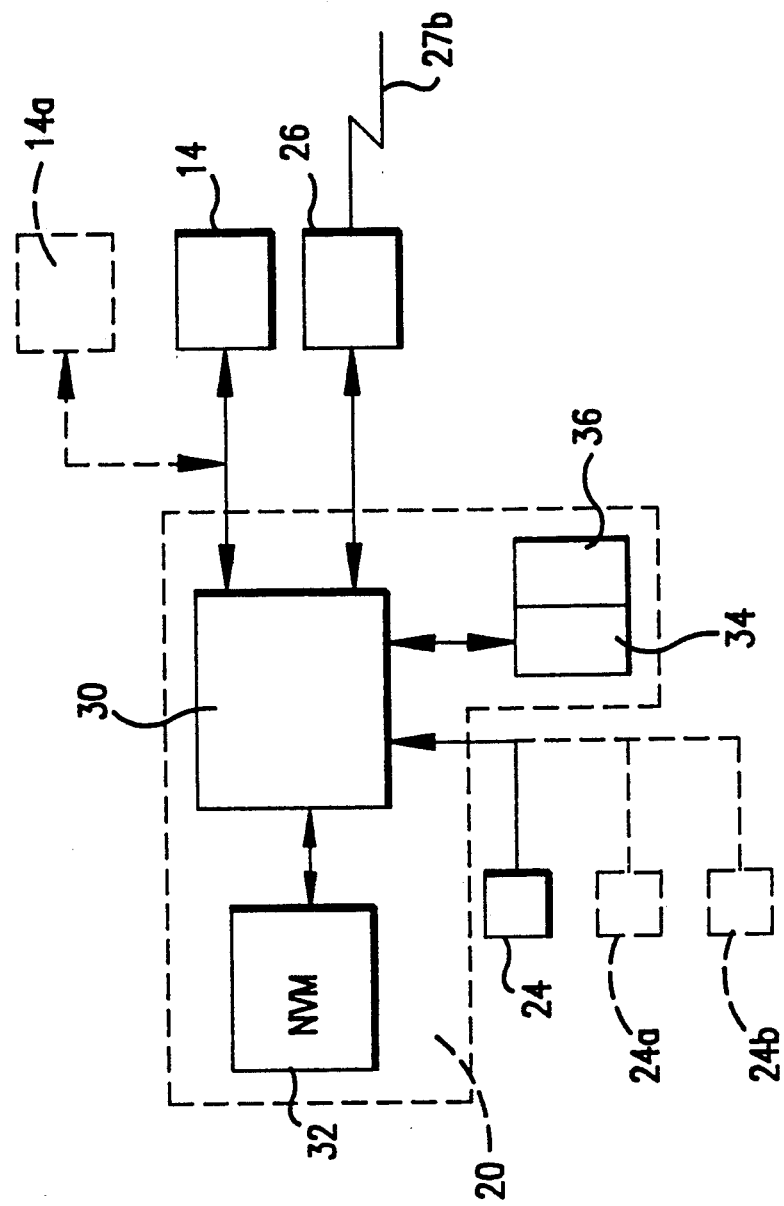

CONSUMABLE SUPPLIES MONITORING/ORDERING SYSTEM FOR REPROGRAPHIC EQUIPMENT

BACKGROUND OF THE INVENTION

1. Field of the Invention

This invention relates to reprographic machines. In particular, it concerns systems for tracking and reordering consumable supplies for reprographic equipment.

2. Description of Related Art

A reprographic machine having the capability of storing indications of a machine consumable supply, such as developer, displaying the status of such consumable supply and remotely transmitting such indications of usage is known. An example of such a reprographic machine is disclosed in U.S. Pat. No. 4,496,237, the disclosure of which is incorporated herein by reference. While the machine disclosed in the above-identified patent can provide status information regarding usage of elements and supplies, it does so only with respect to element or supplies within that machine. It has no capability for tracking an overall inventory of consumable supplies maintained exterior to the machine or to track usage of consumable supplies from a plurality of machines.

However, the control of inventory levels for consumable supplies has been recognized as very desirable, particularly with large volume reprographic operations that operate several reprographic machines at one location. A goal is to achieve just-in-time inventory control so that inventory carrying costs can be minimized.

SUMMARY OF THE INVENTION

The invention provides a consumable supplies monitoring system for monitoring an inventory of consumable supplies consumed by the plurality of reprographic machines. At least one of the reprographic machines includes an inventory tracking system. The inventory tracking system is provided with information relating to usage of each of the consumable materials by the plurality of reprographic machines. A display on the reprographic machine, or on each of the reprographic machines, displays requested information from the inventory tracking system. Through remote interactive communication capabilities, the system can automatically or semi-automatically submit orders for supplies, receive information relating to estimated and/or delayed shipping dates, and update the status of the inventory on the basis of confirmed shipment or order receipt information.

BRIEF DESCRIPTION OF THE DRAWINGS

For a better understanding of the present invention, reference may be had to the accompanying drawings, wherein the same reference numerals have been applied to like parts and wherein:

FIG. 5 is a schematic view of an inventory tracking system in accordance with the present invention;

DESCRIPTION OF PREFERRED EMBODIMENTS

Figure 1:
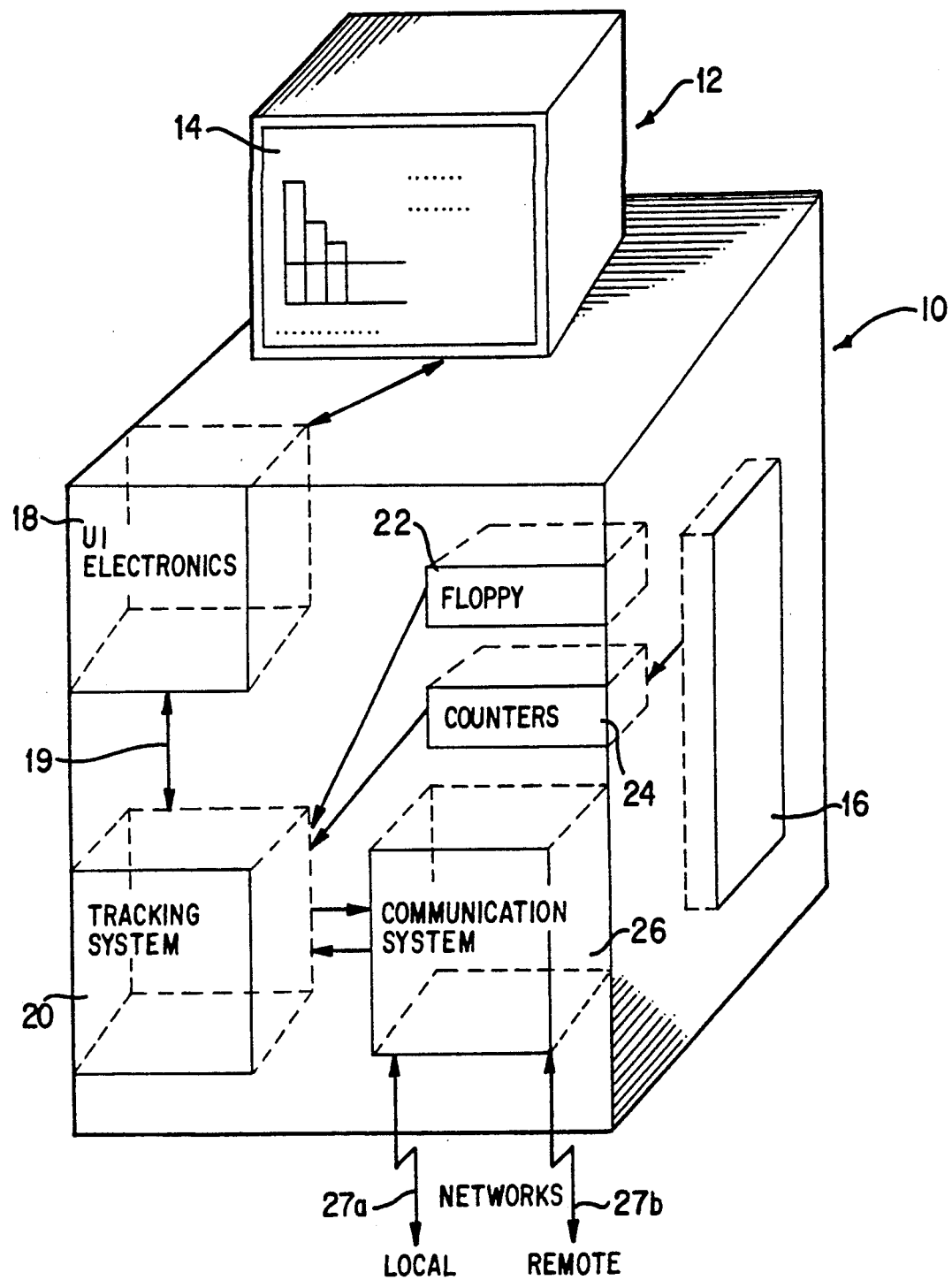
FIG. 1 is a three dimensional schematic view of a reprographic machine employing the present invention.

Referring to FIG. 1, a reprographic machine 10, such as an electrophotographic machine, an ink jet printer, etc. for producing hard copies of documents by applying marking materials, such as electrostatic toners or inks, to recording media, such as paper sheets. Basic printing and document handling systems are known and are shown, for example in the above mentioned U.S. Pat. No. 4,496,237. Other than as noted below, the particular details of such a system are not necessary for an understanding of the present invention and the system is represented by the three dimensional box 16, schematically representing the printing system within the reprographic machine 10.

Preferably, the reprographic machine 10 utilizes a user interface 12 having a touch screen 14 for providing operator input for control of the machine and for displaying operating information, diagnostic results, and, in accordance with the present invention, inventory information. Such user interface systems are known and are disclosed, for example, in U.S. Pat. Nos. 5,038,319 and 5,057,866, the disclosures of which are incorporated herein by reference. The user interface 12 is linked to a user interface control module 18 that controls the display of information on the touch screen 14 and communicates control information from the touch screen 14 to subsystems within the reprographic machine 10. With particular reference to the present invention, the user interface module is connected by a suitable data bus 19 for providing signals to and receiving signals from an inventory tracking system module 20 that tracks the inventory and reorder status of consumable supplies, such as marking materials in the form of toners or inks, and recording media, such as paper sheets. The module 20 can comprise a printed wire board (PWB) with a microprocessor and memories for storing, updating and calculating inventory information using appropriate software routines. The detailed operation of the tracking system will be described below.

The reprographic machine 10 preferably includes an input/output port 22, such as a floppy disk port, for providing programs, program updates and, if desired, inventory updating information.

The reprographic machine 10 also includes one or more counters 24. The counters 24 receive information from sensors in the printing system 16 relating to the number of impressions or number of copy sheets cycled through the printer 16. Preferably, after the completion of a copy run, each counter 24 is updated. A counter 24 is provided for each consumable supply item being tracked, such as paper sheets in several sizes and toner or ink cartridges. From this data, usage information can be derived relating to the number of sheets of each size of paper or the amount of toner or ink used in the predetermined time period. Alternatively, based on paper sheet usage, toner and ink consumption can also be derived on the basis of average marking material usage per sheet.

Figure 2:
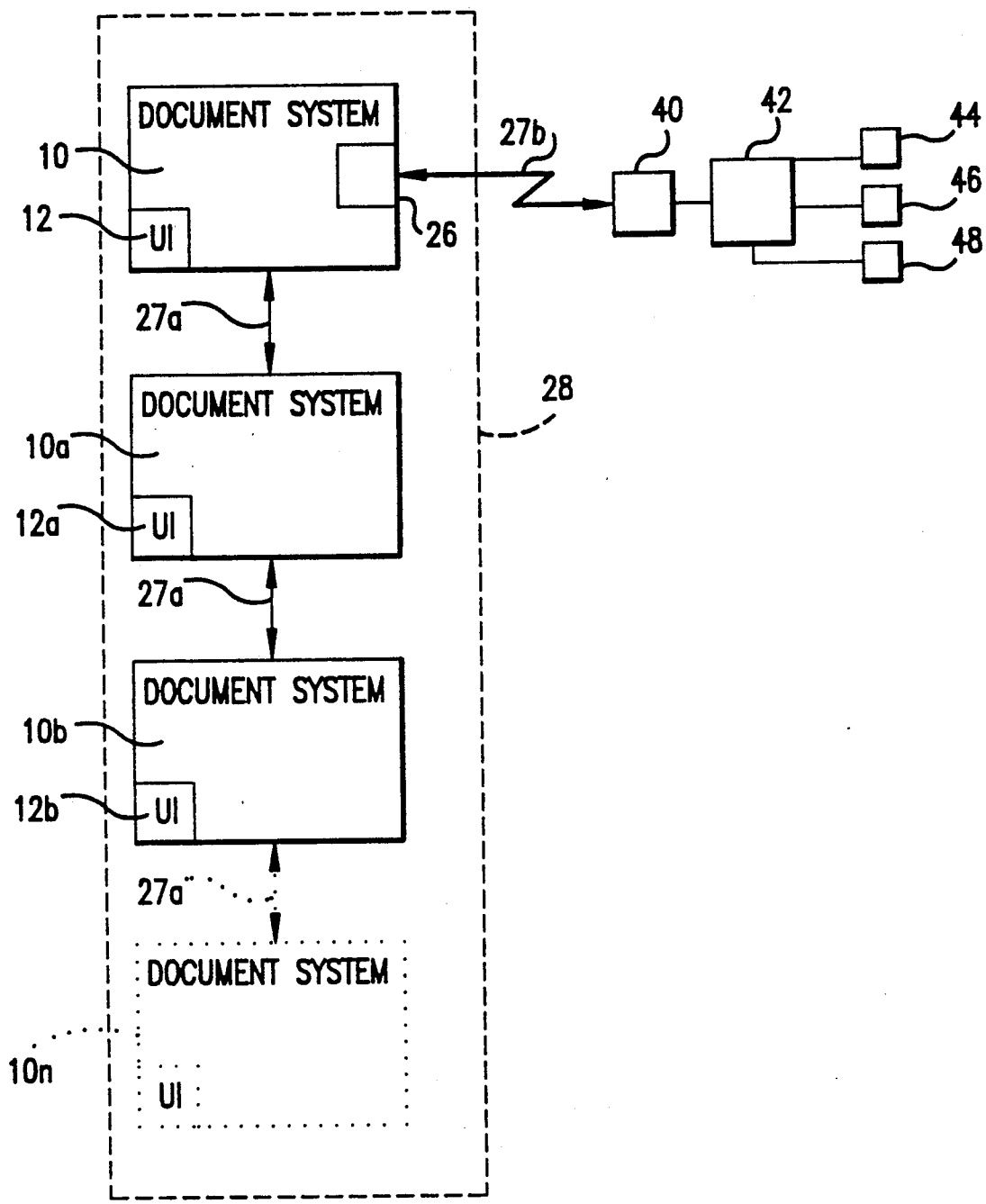
FIG. 2 is a schematic view of a plurality of reprographic machines networked into a local system and in communication with a remote material supplies source.

A communication systems module 26 is also associated with the reprographic machine 10. The communication system 26 includes a shared line 27a for linking other similar reprographic machines 10a, 10b . . . 10n (FIG. 2) in a local area network 28. The shared line 27a provides for linking of a plurality of counters 24 in each of the reprographic machines 10a, 10b . . . 10n to the tracking system module in the reprographic machine 10. Further, the shared line 26a can provide for commands to be initiated at the user interfaces 12a, 12b . . . 12n of the other reprographic machines in the network to the tracking system module 20 so that commands to and requested information from the tracking system 20 can be displayed on any selected one of the user interfaces 12a, 12b . . . 12n.

The reprographic machine 10 is provided with a remote communication capability, for example, via a remote interactive communication (RIC) system, so that information to and from a remote supplies ordering location can be effected. In this regard, the communication system module 26 includes a suitable printed wire board and associated software constituting a modem for connecting the reprographic machine 10 to a public switched telephone network. Alternatively machine 10 can communicate via a dedicated telecommunication system or other form of data transmission system. At the supplies reordering location, a modem 40 receives data from or provides data to the link 27b. Data from the network 28 comprises primarily orders for supplies consumed in the network 28. Information from the reorder site can comprise order confirmations, expected delivery dates and shipment confirmations. To enable such communication at the remote ordering site, a personal computer 42 with modem 40 is provided. The personal computer 42 drives a display, such as a CRT or flat screen 44 and a printer 48. Incoming ordering information can be controlled by the personal computer 42 to display the information on display 44 and/or provide a hard copy of the order via printer 48. A manual input device, such as a keyboard 46, is provided so that supply point personnel can enter expected delivery dates and confirm shipments. Expected delivery and shipment information can be transmitted via link 27b to reprographic machine 10 and displayed on the UI 12 of reprographic machine 10 or another of the reprographic machines in the network 28.

Figure 3:
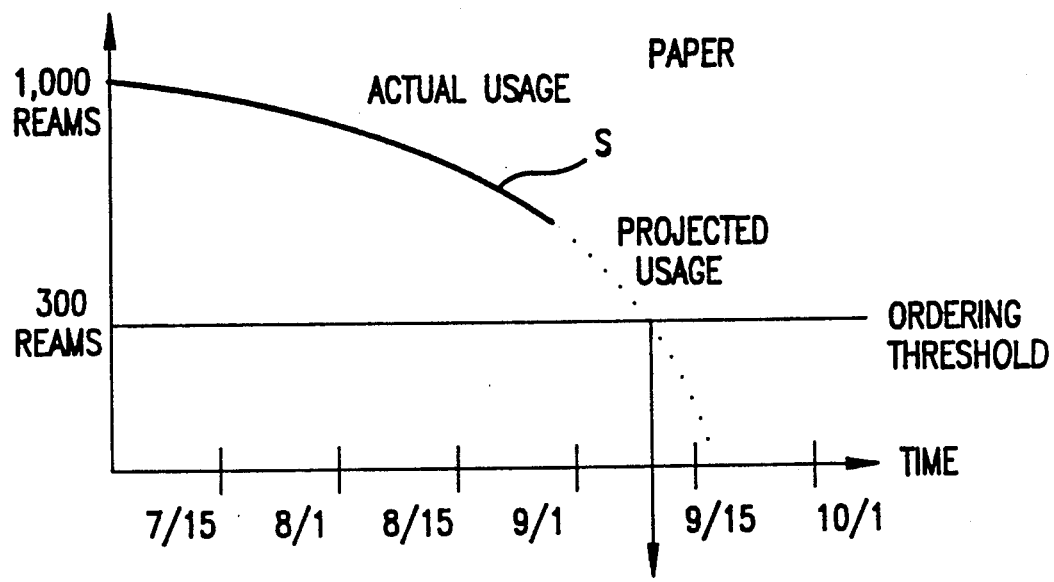
FIG. 3 is a graph showing a display of inventory information utilizing a projected usage curve.
Figure 4:
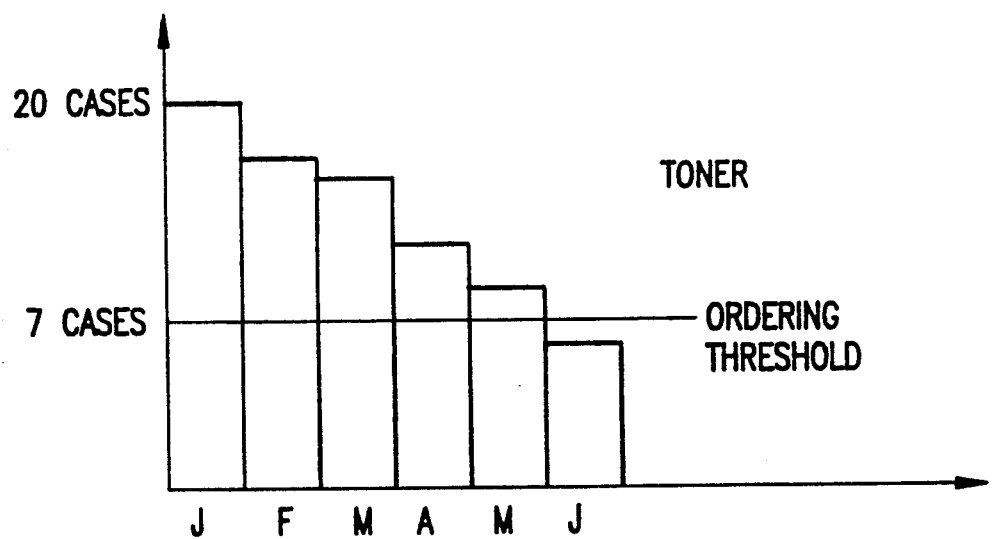
FIG. 4 is a display utilizing a histogram.

FIGS. 3 and 4 graphically describe the inventory tracking process which takes place in the tracking system module 20 (FIG. 5) for each consumable supply being tracked and also illustrate the form of inventory information that can be provided to UI 12. The system is initialized at start up and upon receipt of each shipment by providing quantity information to a microprocessor 30 which, as is conventional, contains a random access memory for performing data calculations and manipulations and a read only memory for storing software to enable the various operations of the tracking system 20. Input information may be provided to the microprocessor 30 through the user interface 14, for example when an order is received, or through the communications module 26, where shipment confirmation data is received through the communications system linking reprographic machine 10 to the material supply location. This initializing information is stored in non-volatile memory 32 for each consumable material being tracked. Counters 24, 24a, 24b in each of the plurality of reprographic machines provide usage data to microprocessor 30. On the basis of this data, sheet counts or cartridge counts are accumulated in non-volatile memory 32 to provide actual usage data, which is decremented against the initial inventory amount to show remaining inventory. Actual usage data is utilized to calculate a curve S, for each consumable item being tracked. Curve S includes an actual usage portion and a projected usage portion. The intersection of the projected usage portion with the ordering threshold yields a reorder point. The curve S may be periodically recalculated on the basis of new actual usage data to modify the reorder point. The thresholds for each item being tracked can be modified by inputs through a user input, such as touch screen 14 or port 22. The reorder point calculation is performed in a determining means 34 forming a portion of the processing portion of microprocessor 30.

Periodically, or each time the inventory for a particular item is decremented, a judging means 36, for example, a comparator, makes a judgment to determine if the inventory level has passed the ordering threshold. If the judgment means 36 makes an affirmative determination, the microprocessor 30 controls UI 12 to show a reorder message to alert the operator that reorder is necessary. Alternatively, the reorder information can be either automatically sent by the communications module 26 to the reorder location directly, or semi-automatically after confirmation via the touch screen 14 by the operator.

Figure 6A:
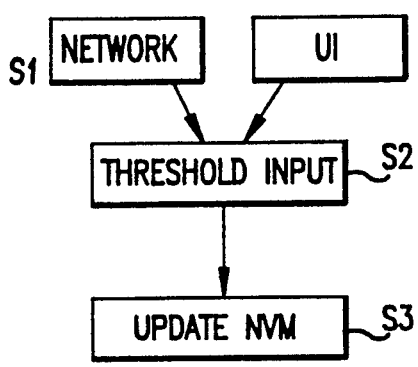
FIGS. 6A and 6B are flowcharts illustrating the initializing and inventory delivery portions of an inventory control system.

Referring to FIG. 6A, when the inventory control system is initialized, a starting threshold is input from the communication system 26 or the user interface 12 and is identified at step S2 as a threshold input for one of the consumable materials being tracked. When the information is identified as initializing data at S2, the information is stored in the non-volatile memory 32, at step S3. The value stored at S3 is used as a starting value for inventory of a plurality consumable materials being tracked.

Figure 6B:
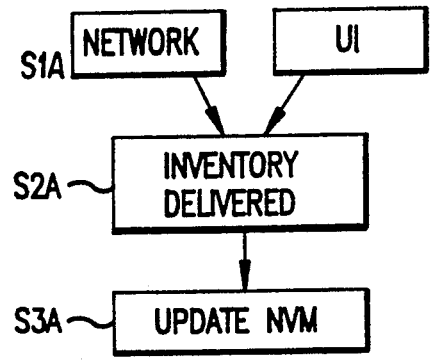

Similarly, FIG. 6B is a flowchart showing the processing of inventory delivery information. In Step S1A, delivery information is supplied by the communication system 26 from the personal computer 42 at the remote reorder site or, alternatively, by an operator through the user interface 12. At step S2A, the information input is identified by quantity and type as inventory delivered. The quantity identified at S2A is added to the balance in non-volatile memory 32 to update the amount of the particular consumable material concerned.

Figure 7:
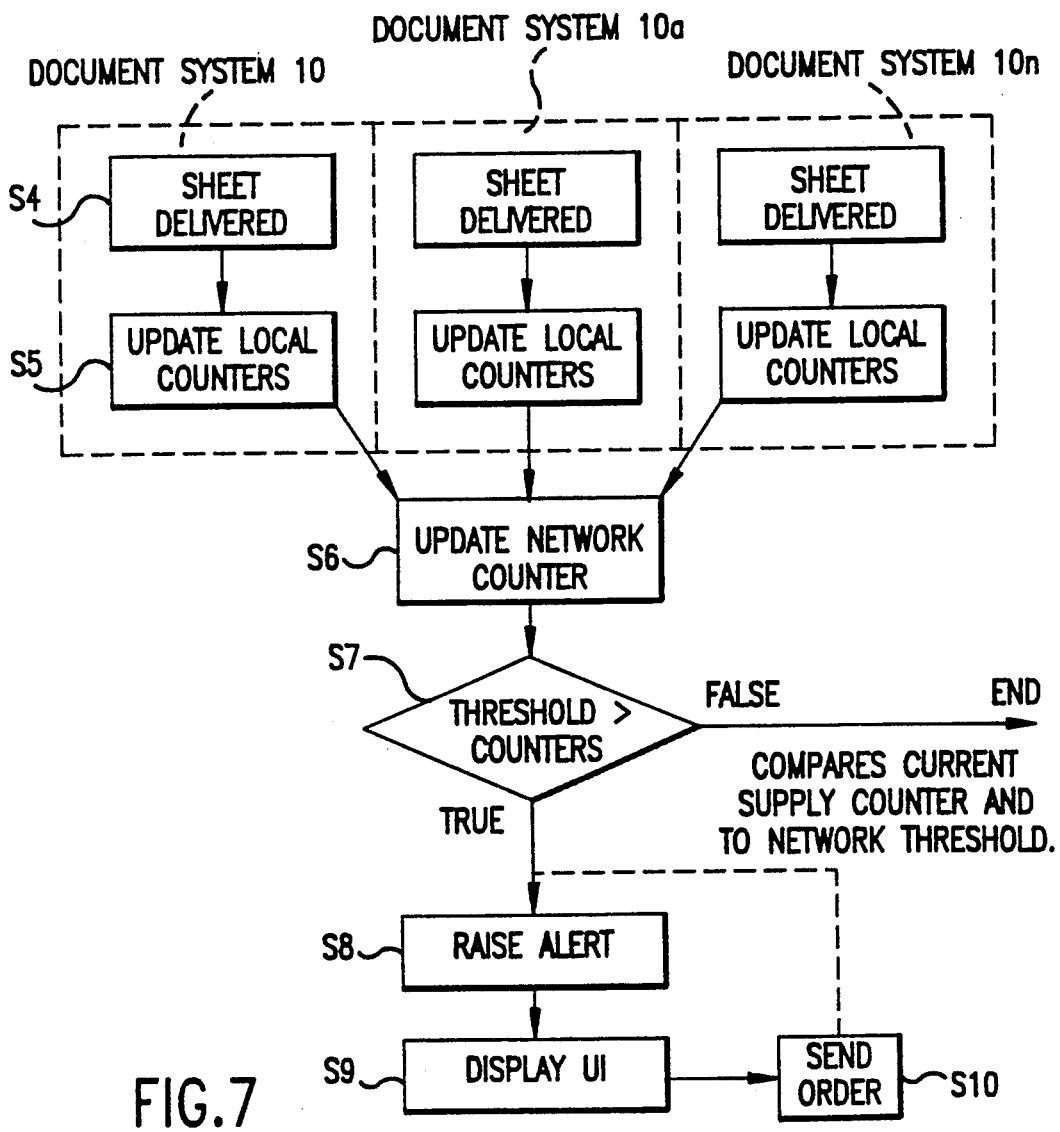
FIG. 7 is a flowchart of the tracking portion of an inventory control system showing the accumulation of usage data and determination of whether a reorder threshold has been met.

FIG. 7 is a flowchart illustrating the inventory tracking and reorder system as usage occurs. At step S4, an event representative of usage of a consumable material, such as the exit of a paper sheet from the printer 16, is sensed by sensors (not shown) within each of the document systems 10, 10A . . . $10_n$. The output of the sensor updates local counters 24 at step S5 in each of the document systems. Periodically, or upon inquiry by the microprocessor 30, the counts of the local counters 24 are subtracted from the value stored in NVM 32, as in step S6, in the determining means 34 of the microprocessor 30. The flow from step S6 then proceeds to S7 wherein a judgment is made in the judging means 36 whether or not the new inventory amount stored in NVM 32 is below the threshold. If the present amount is not below the threshold, the flow ends. If the present amount is below the threshold, two alternative routes can be followed. The processing can proceed to step S8 where a decision is made to raise an alert and that alert is displayed at step S9 on the user interface 12. An operator can, with an appropriate input to the touch screen 14, confirm the need for resupply and, through a suitable software or hardware switch direct the flow to S10 wherein an order, identifying the machine or network, the material needed, and the quantity, is sent via the communications module 26 to the remote reorder site. Alternatively, the flow can proceed directly from step S7 to step S10, thereby effecting an automatic reordering without operator input. The information identifying the machine or network from which the order is placed can be stored in NVM 32. As well, a standard reorder amount for the material being reordered is stored in NVM 32 and can be changed by operator input through touchscreen 14 or from the reorder site via the link 27b.

The above described system has many advantages. An instantaneous status of the inventory of consumable supplies is available to an operator or the Ul 12. Reordering of supplies can be automated or semi-automated, thereby providing for just-in-time inventory control. Reorder thresholds can be customized for unique conditions at each customer site to accommodate for differences in the amount of supplies storage available, usage rates and delivery times. A single inventory tracking system can be utilized to monitor inventory levels for a network comprising a plurality of reprographic machines.

What is claimed is:

1. A consumable supplies monitoring, locating and ordering system comprising:
   a plurality of reprographic machines arranged in a network;
   an inventory tracking system in communication with the network of reprographic machines for tracking an inventory of at least one consumable material consumed by said plurality of reprographic machines;
   a plurality of usage means, one usage means being disposed in each of the reprographic machines for determining usage information relating to the at least one consumable material;
   means for supplying said usage information from each of the usage means to the inventory tracking system;
   the inventory tracking system including a determining means for determining a projected reordering point for the at least one consumable material based on the usage information from the plurality of usage means and determining a customized inventory threshold for each of the plurality of reprographic machines to accommodate differences in the usage information generated by each of the plurality of usage means;
   a user interface associated with at least one of said reprographic machines;
   means for displaying information from the inventory tracking system on the user interface when at least one of the projected reordering point and customized inventory threshold for the at least one consumable material being tracked is reached, or in response to operator commands; and
   means for ordering a resupply of the at least one consumable material when at least one of the projected reordering point and customized inventory threshold is reached.

2. The monitoring system as in claim 1, wherein the inventory tracking system is disposed within one of the plurality of networked reprographic machines.

3. The monitoring system as in claim 1, wherein the inventory tracking system includes means for storing information concerning inventories of a plurality of consumable materials.

4. The monitoring system as in claim 3, wherein the consumable materials include a recording medium and a marking material.

5. The system as in claim 1, wherein the inventory tracking system includes a judging means for judging that a reorder point for the at least one consumable material has been reached and means responsive to the judging means for displaying reorder information on the user interface indicative of reaching at least one of the projected reordering point and customized inventory threshold.

6. The monitoring system as in claim 5, wherein the judging means includes means for storing an inventory threshold value and means for determining if a stored inventory value is below the threshold value.

7. The monitoring system as in claim 5, further comprising a communications interface for communicating the reorder information to a remote location.

8. The monitoring system as in claim 1, wherein the inventory tracking system includes a judging means for judging that a reorder point has been reached for said at least one consumable material; a communications interface is associated with at least one of said reprographic machines; and
   the means for ordering further comprises means for sending an order for the at least one consumable material to a supplies ordering location via the communications interface in response to a judgment by the judging means that a reorder point is reached.

9. The monitoring system as in claim 8, further comprising an input means associated with the inventory tracking means for providing resupply information concerning the at least one consumable material to the inventory tracking system.

10. The monitoring system as in claim 9, wherein the input means is operator actuated.

11. A monitoring system as in claim 9, wherein the input means includes means for accepting information from the communications interface.

* * * * *